Nov. 23, 1937.  H. HUEBER ET AL  2,100,281
MOTOR VEHICLE TEMPERATURE MODIFIER
Filed May 29, 1933  2 Sheets-Sheet 1
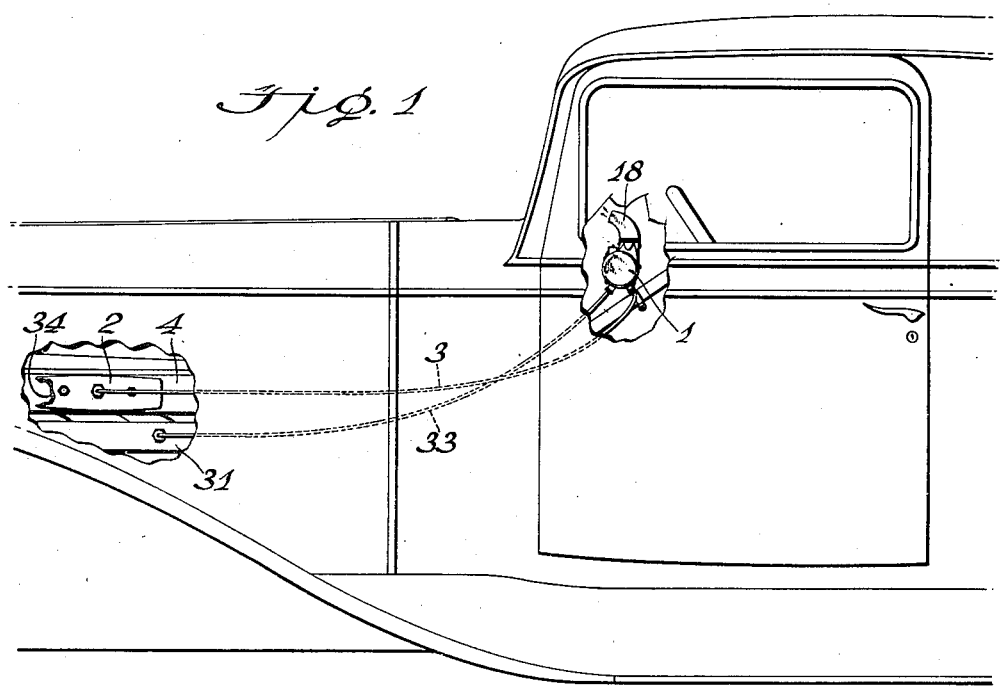
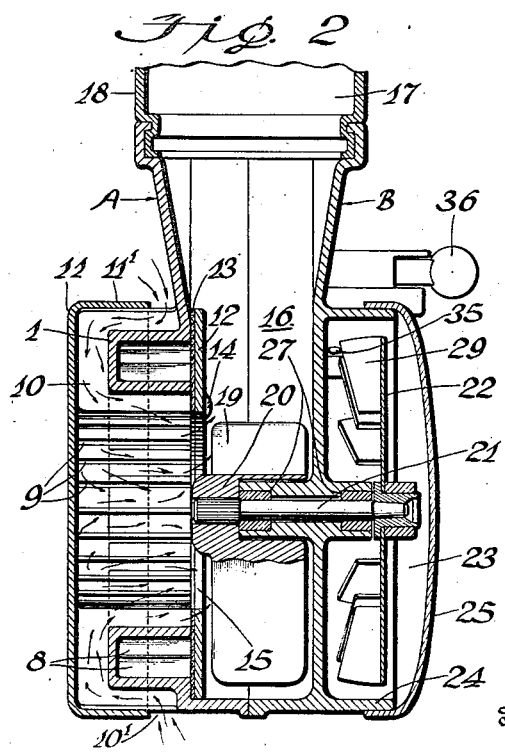
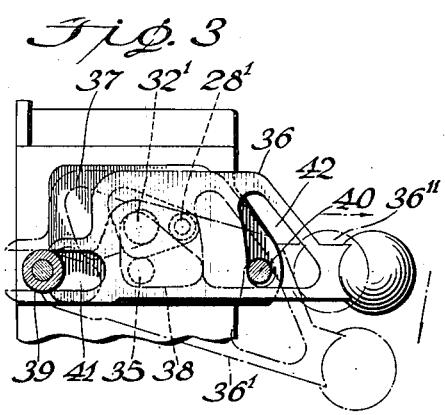
Inventors
Henry Hueber &
Erwin C. Horton.
By Bean & Brooks, Attorneys Nov. 23, 1937.    H. HUEBER ET AL    2,100,281
MOTOR VEHICLE TEMPERATURE MODIFIER
Filed May 29, 1933    2 Sheets-Sheet 2
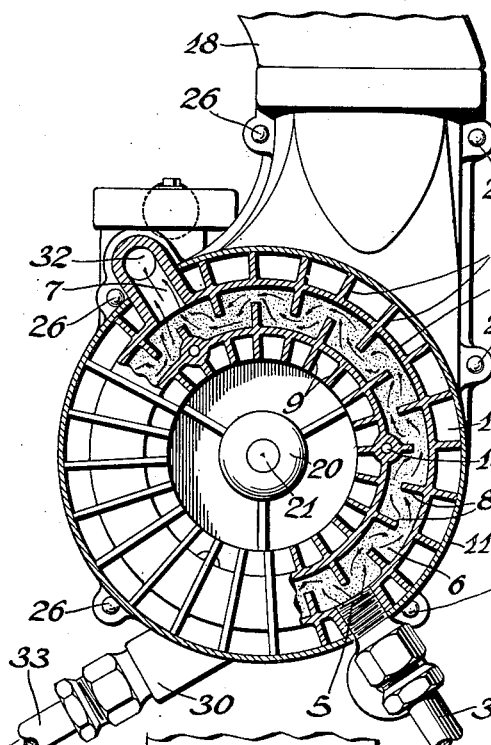
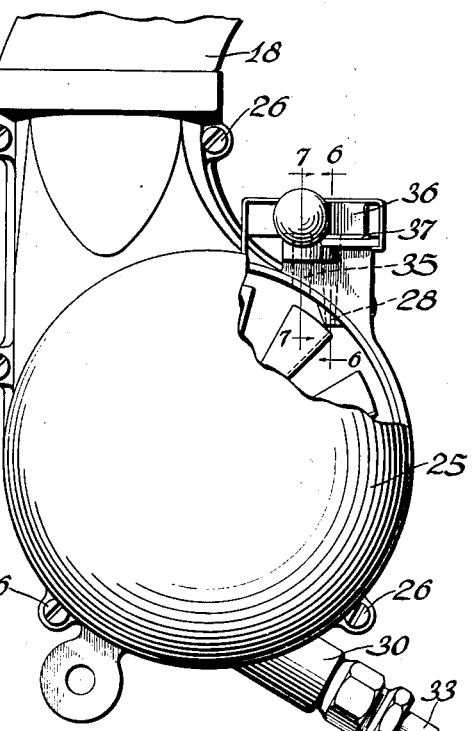
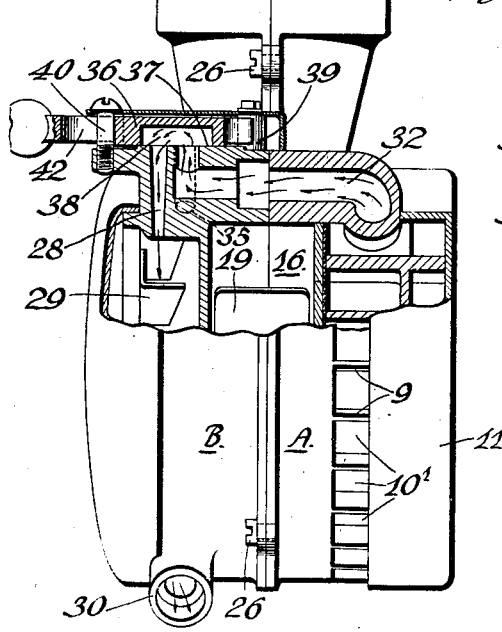
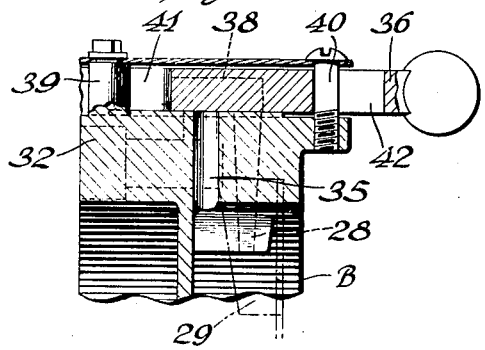
Inventors
Henry Hueber, &
Erwin C. Horton,
By Bean & Brooks    Attorneys Patented Nov. 23, 1937

2,100,281

UNITED STATES PATENT OFFICE 2,100,281

MOTOR VEHICLE TEMPERATURE MODIFIER

Henry Hueber, Buffalo, and Erwin C. Horton, Hamburg, N. Y., assignors to Trico Products Corporation, Buffalo, N. Y.

Application May 29, 1933, Serial No. 673,552

20 Claims. (Cl. 237—12.3)

This invention relates to a heater for the passenger compartments of motor vehicles.

For the heating of motor cars it has been heretofore proposed to use warm air heaters in which a current of air is passed over the exhaust manifold of the internal combustion engine and delivered to the passenger compartment, but in this type of heaters the structures have been rather crude and also objectionable due to the fact that they carry the engine odors from beneath the hood into the passenger compartment of the car.

It has also been proposed to provide a hot water heater in the passenger compartment connected to the engine cooling system so that a portion of the engine cooling liquid passes through the hot water heater, but in this type the radiator is of heavy construction and subject to leakage of liquid from the system. Furthermore, in this type an electric motor is used to pass a current of air over the radiator, which motor is a constant drain upon the storage battery.

The present invention has for its object to provide a practical vehicle heater which derives its heat from a circulation of fluid from the motor vehicle engine and which will provide a maximum quantity of warm air for the passenger compartment of the motor vehicle in a very economical manner.

In the drawings:

Fig. 1 is a fragmentary showing of a motor vehicle equipped with a heater constructed in accordance with the present invention.

Fig. 2 is a vertical section through the heater.

Fig. 3 is a detailed showing of the heater control.

Fig. 4 is an elevation, partly broken away, of the heater.

Fig. 5 is an irregular transverse section of the heater.

Fig. 6 is a view broken away about on line 6—6 of Fig. 4 to more clearly disclose the communicating fluid passages.

Fig. 7 is a sectional view about on line 7—7 of Fig. 4 depicting the by-pass port or passage.

In proceeding in accordance with the present invention, the heater unit comprises a radiator 1 connected to a source of heated air 2 by a conduit 3, which source is herein illustrated as being in the form of a stove mounted on the exhaust manifold 4 of the motor vehicle internal combustion engine so as to derive heat therefrom for highly heating the air drawn through the stove. Consequently the heated air delivered by the conduit 3 will pass into the radiator 1 through its inlet 5 and circulate about the radiator chamber 6 before finally passing out through the outlet 7. In order to effect a maximum heat exchange between the hot air current and the radiator, the inner walls of the chamber 6 may be provided with heat absorbing fins 8 so staggered as not to materially obstruct the free passage of the air stream through the chamber.

In the form illustrated the radiator is annular and provided on its exterior surface with heat radiating fins 9 which extend from within the annulus over one surface thereof to the outer side or periphery thereof. The radiating fins are preferably continuous and define substantially U-shaped channels 10 (Fig. 2). A cap 11 is mounted over the radiator so as to confine the air, which is to be warmed, within the channels 10 as it passes over the radiator. The skirt 11' of the cap terminates short of the full length of the fins 9 to provide inlet openings 10' to the channels 10.

The radiator 1 is preferably cast and to facilitate such casting operation the chamber 6 is formed open at one side, such open side of the chamber being closed by a ring-shaped wall plate 12 faced by a suitable packing member 13 and secured into place as by means of fasteners 14. The wall plate, being in the form of a ring, defines an entrance opening 15 into a pump or blower chamber 16 which has its outlet 17 tangentially disposed and herein provided with a swiveled discharge nozzle or distributor 18 by which the warm air from the channels 10 may be directed as desired. The blower fan 19 has its hub 20 fixed to a shaft 21 and is disposed substantially concentric with the opening 15 so that as the fan rotates it will intake air through the heating channels 10 of the radiator, draw the same through the opening 15 into the blower chamber and forcibly discharge it through the outlet 17 and nozzle 18.

The blower fan shaft 21 is rotated by a power element preferably driven by fluid pressure and in accordance with the present disclosure this source of power is illustrated as being of the turbine motor type. The rotor 22 of the turbine drive is fixed to the shaft 21 where the latter protrudes into the rotor chamber 23, this chamber being conveniently formed by an upstanding flange 24 cast on the blower housing and to which is secured a complemental cover section 25 so as to completely enclose the rotor 22.

In this connection it will be observed that the heater unit is composed of two complemental sections A and B, each a casting and the two castings being united as by screws 26 and conjointly forming the blower chamber 16. The section A contains the radiator chamber 6 while the section B is provided with bearings 27 in which the shaft 21 is journaled.

The rotor is driven by fluid pressure, such as by a jet of air discharging from the nozzle 28 against the blades 29 of the rotor 22. In the particular showing or embodiment of the invention the rotor chamber is provided with an outlet 30 which is connected to the intake manifold 31 of the vehicle engine so that the low pressure induced in the intake manifold will draw air from the rotor chamber and this in turn will effect a replenishing discharge of fluid from the jet or nozzle 28 against the blades 29 of the rotor and thereby impart the desired rotary motion thereto for driving the blower fan.

In order to create a flow of hot air from the stove 2 through the radiator chamber 6 the exit or outlet 7 of said chamber is likewise preferably connected to the intake manifold so as to be influenced by the low pressures maintaining therein during the engine operation. This manifold connection may be common with that of the turbine and accordingly the outlet 7 is connected to the jet or nozzle 28 of the turbine as by means of transverse passage 32. Consequently the intake manifold 31, through its connecting conduit 33, induces a low pressure not only in the rotor chamber 23 but, through the connecting passage 32, also lowers the pressure in the radiator chamber 6 whereby a flow of the outside atmosphere will start through the inlet 34 of the stove 2 and continue through the radiator chamber and the rotor chamber and discharge into the intake manifold.

In its passage through the stove the air stream becomes highly heated for effecting a heat exchange in the radiator 1, and subsequent to this the same air stream is utilized by the direction of the jet 28 to impel the rotor 22 and thereby set in operation the blower 19. With the blower in action, the air from the passenger compartment of the motor vehicle will be drawn inwardly through the heating channels 10 of the radiator and discharged from the distributor 18 for the comfort of the passengers. If desired, the distributor may direct its warm air against the windshield to free the same of moisture and ice.

Means are provided to vary the temperature of the air delivered by the distributor 18. This may be accomplished by changing the proportion of the air stream which is utilized by the radiator with respect to the volume of air utilized to impel the rotor. For instance, this proportion may be varied by increasing or decreasing the volume of air supplied to the jet 28. To this end there is provided a by-pass 35 for all of the air in excess to that required to operate the rotor at the desired speed.

The functioning of the unit is determined by a control valve 36 which is slidable in and out over a valve seat 37 to close and open communication between the port 32' of connecting passage 32 and port 28' of the jet 28, the valve being provided with a bridging passage 38 (Fig. 6). The valve is guided in its out movement by guide pins 39 and 40 engaging respectively in openings or guideways 41 and 42 of the valve. The opening 42 is extended laterally so as to permit of the valve being swung about guide pin 39 as a pivot and thereby enable the jet port 28' to be closed more or less and, inversely, a more or less open communication be established between port 35' of the by-pass 35 and port 32'. When it is desired to stop the operation of the blower fan altogether the valve is swung to its extreme left position, indicated at 36' in Fig. 3. This permits a minimum heating of the unit. When it is desired to completely interrupt the functioning of the device the valve is pushed inwardly to its innermost position, indicated at 36''. The by-pass 35 discharges into the outlet port 30 so that the shunt air stream therethrough will have little or no influence on the rotor. This is accomplished in the present showing by having the by-pass 35 discharge into the rotor chamber to one side of the plane of the rotor so as not to impinge on the blades thereof. Consequently, such by-passed air stream will be ineffective on the rotor and only that portion of the divided stream which discharges from the jet 28 will impel the rotor.

The operation of the unit is believed to be obvious from the foregoing. The unit, as illustrated, derives its heat from air passing over the exhaust manifold, such hot air passing initially through the radiator so as to effect a heat exchange from the hottest side of the air stream, and from thence the stream, having given off some of its heat, moves into the turbine for having its kinetic energy spent upon the rotor before final passage into the intake manifold. Thus, none of the hot air which comes from beneath the engine hood directly finds its way into the passenger compartment, but rather the air from within the passenger compartment, or a fresh supply of air from the outside where this may be desired, is caused to circulate over the radiator with a variable velocity by which the temperature of the discharged blast may be effectively controlled. Thus, the temperature of the passenger compartment is regulatable by the single air stream, which serves not only as the power but also the heating medium, without the presence of engine odors and without drain upon the storage battery or the power plant in general, and should leakage accidentally occur along the suction line there will be no deleterious effects since the air stream is under tension by reason of the suction or sub-atmospheric pressure and thus will be held against escape due to the higher, outside atmospheric pressure.

The term "passenger compartment" is used broadly herein to include any compartment in which the temperature is to be regulated or controlled and, likewise, the term "stove" is used for ease of description only since it might obviously be replaced by an air cooler or other temperature modifier; also, the term "heater" has been used broadly as a temperature modifier.

What is claimed is:

1. A temperature regulating unit for the passenger compartments of motor vehicles, comprising a radiator having an inlet opening and an outlet opening, means for creating a flow of air over the radiator, fluid pressure operated means for actuating said air flow means, said fluid pressure operated means having an inlet opening and an outlet opening, one of said last named openings being connected to one of said first named openings whereby fluid flow communication is established between the radiator and the fluid pressure operated means so that the fluid used for the operation of said fluid pressure operated means will also move through the radiator for the exchange of heat therein, and means for varying the quantity of fluid that is effective to drive said fluid operated means with respect to the quantity passing through said radiator.

2. A temperature regulating unit for motor vehicles, comprising a pair of casing sections complementing each other to form an interposed blower chamber, one section containing a radiator chamber, the companion section containing a rotor chamber, means within the blower chamber for moving air across the radiator for modifying the temperature of the same for delivery into the passenger compartment of the motor vehicle, means for directing a flow of temperature modifying fluid into the radiator chamber, a rotor in said rotor chamber, means for operatively directing fluid into said rotor chamber to operate said rotor, and an operative connection between said rotor and said air flow means.

3. A temperature regulating unit for motor vehicles comprising a pair of complemental casing sections forming a pump chamber, one casing section carrying a radiator and the second casing section carrying a motor, pump means within the pump chamber and operable by said motor for creating a flow of air over the radiator, and means for securing the casing sections together, said pump means being enclosed by said complemental sections and said pump chamber separating said motor from said radiator.

4. A temperature regulating unit for the passenger compartment of a motor vehicle, comprising a radiator having an inlet opening and an outlet opening, means for creating a flow of air over the radiator for use in the passenger compartment, fluid pressure operated means for actuating said air flow means, said fluid pressure operated means having an inlet opening and an outlet opening, one of said last named openings being connected to one of said first named openings whereby fluid communication is established between the radiator and the fluid pressure operated means so that the fluid used for the operation of said fluid pressure operated means will also move through the radiator for the exchange of heat therein, and means for varying the speed of operation of the fluid pressure operated means while maintaining the fluid flow through the radiator substantially constant.

5. A radiator for motor vehicles, comprising an annular body having a chamber therein with means for establishing circulatory connections with the chamber, said body having exterior heat radiating fins, and a cup-shaped cap fitting over the body and supported by said fins spaced therefrom to define therewith air heating channels from the outer periphery of the body inwardly over the latter.

6. A temperature modifying unit for motor vehicles, comprising a body section having a motor chamber, a shaft journaled in a wall of said chamber and extending therethrough, pump means arranged on the opposite side of said wall and operatively connected to the protruding end of the shaft for creating an air stream, and a radiator cooperating with said body section to form a chamber for said pump means, said radiator having air heating passages providing inlet communication with the pump means whereby said pump means will effect a movement of air over the radiator surface.

7. A temperature modifier for motor vehicles, comprising a unitary structure having a radiator chamber, a separable motor chamber, interposed pump means for moving an air stream over the radiator surface, means in said motor chamber for driving said interposed pump means, and means for directing fluid from the radiator chamber into said motor chamber for operating said drive means.

8. A temperature modifier for motor vehicles, comprising a radiator chamber, a motor chamber, pump means for moving an air stream over the radiator surface, means in said motor chamber for driving said pump means, means for moving fluid from the radiator chamber into said motor chamber for operating said drive means, and means for varying the quantity of fluid that is effective to drive said fluid operated means with respect to the quantity passing through said radiator.

9. A temperature modifier for the passenger compartments of motor vehicles, comprising in combination with the intake and exhaust manifolds of an internal combustion engine for the vehicle, a chambered radiator having an inlet connection taking warm fluid from off the exhaust manifold and an outlet connection delivering such fluid to the intake manifold, a fluid pressure motor having an inlet port and an outlet port, said ports connected in circuit with said manifold connections, means operable by the motor to circulate air over the radiator for delivery to the passenger compartment, and means for adjustably regulating the fluid flow through the radiator chamber and said motor.

10. A temperature regulating unit for the passenger compartments of motor vehicles having an internal combustion power plant provided with intake and exhaust passages, comprising a radiator having a warm air inlet leading from a point adjacent the exhaust passage, fluid pressure operated means for creating a flow of air over the radiator, said radiator having an outlet communicating through a passage with said fluid pressure operated means for supplying fluid for the operation thereof, said fluid pressure operated means having an outlet communicating with the intake passage, and means within the unit for varying the quantity of fluid that is effective to drive said fluid pressure operated means with respect to the quantity passing through said radiator.

11. A heater unit for the passenger compartments of motor vehicles, comprising a substantially annular body having inlet and outlet openings, said annular body having inner and outer peripheral faces, joined by a connecting face, a plurality of heat radiating fins extending over one of the peripheral faces and said joining face and forming therewith a series of air passages, means seating on said fins for confining the movement of the air through said passages and over such finned faces, a pump chamber having communication with the space enclosed by said annular body, and rotary pump means disposed within the chamber in substantially axial alignment with the annular body.

12. A heater for motor vehicles comprising a pump chamber having a tangential discharge opening and an axial intake opening and a blower in said chamber, an annular radiator mounted on the wall of the pump chamber about the axial intake opening, said radiator having inlet and outlet passages for circulatory connection with a source of tempered air, means for directing air inflow radially inwardly over the annular radiator and to the pump chamber, a motor chamber arranged on the wall of the pump chamber opposing the intake opening, fluid operated means within the motor chamber for driving the blower, and a controllable communication from the radiator to the motor chamber for controlling the operation of said fluid operated means.

13. A heater for the passenger compartments of motor vehicles comprising, in combination with the intake and exhaust manifolds of the motor vehicle engine, a stove mounted on the exhaust manifold for heating air thereby, said stove having a fresh air inlet, a heater for the passenger compartment of a motor vehicle having a radiator in fluid circuit connection with said stove and said intake manifold, a pump chamber associated with the radiator and having a fresh air inlet thereabout, means within the pump chamber for intaking air through the second fresh air inlet, said pump chamber having a discharge into the passenger compartment of the motor vehicle, and fluid actuated means interposed in the circuit for operating the said air intaking means.

14. A heater for motor vehicles comprising a pump chamber having a tangential discharge opening and an axial intake opening and a blower in said chamber, an annular radiator mounted on the wall of the pump chamber about the axial intake opening, said radiator having inlet and outlet passages for circulatory connection with a source of tempered air, means for directing air inflow radially inwardly over the annular radiator and to the pump chamber, a motor chamber arranged on the wall of the pump chamber opposing the intake opening, and means within the motor chamber for driving the blower.

15. A temperature regulating means for the passenger compartments of motor vehicles, comprising a fluid heating stove, a radiator having inlet and outlet ports, one of said ports being connected to the stove, fluid pressure operated means for creating a flow of air over the radiator and having an operating pressure passage communicating with the radiator through the other of said ports, said other of said ports being adapted for connection to a source of suction for inducing air flow from the stove through the radiator and said fluid pressure operated means, and means for varying the quantity of the heated fluid that is effective to drive said fluid pressure operated means with respect to the quantity passing through said radiator.

16. A temperature regulating means for the passenger compartments of motor vehicles, comprising in combination with the intake and exhaust manifold of an internal combustion engine for the vehicle, a radiator having an inlet connection taking warm fluid from off the exhaust manifold and an outlet connection delivering such fluid to the intake manifold, a fluid pressure motor having an inlet port and an outlet port, said ports connected in circuit with said manifold connections, means operative by the motor to circulate air over the radiator for delivery to the passenger compartment, and means for regulating the fluid flow through the radiator and said motor.

17. A heater for the passenger compartments of motor vehicles comprising, in combination with the intake and exhaust manifolds of the motor vehicle engine, an air heating stove heated by the hot gases of the exhaust manifold and having a fresh air inlet, a radiator in fluid circuit connection with said stove and said intake manifold whereby a flow of heated air is induced from the stove and through the radiator by the low pressure influence in the intake manifold, a pump chamber associated with the radiator and having a fresh air inlet thereabout, means within the pump chamber for intaking air through the second fresh air inlet, said pump chamber having a discharge into the passenger compartment of the motor vehicle, and fluid actuated means interposed in the circuit for actuation by the intake manifold induced airflow whereby the heated air stream which passes through the radiator to heat the latter also actuates said fluid actuated means, the latter being operatively connected to said air intaking means.

18. A heater for the passenger compartments of motor vehicles comprising, in combination with the intake and exhaust manifolds of the motor vehicle engine, an air heating stove heated by the hot gases of the exhaust manifold and having a fresh air inlet, a radiator in fluid circuit connection with said stove and said intake manifold whereby a flow of heated air is induced from the stove and through the radiator by the low pressure influence in the intake manifold, a pump chamber associated with the radiator and having a fresh air inlet thereabout, means within the pump chamber for intaking air through the second fresh air inlet, said pump chamber having a discharge into the passenger compartment of the motor vehicle, and means for actuating said air intaking means to create an air flow through said second fresh air inlet and over the radiator for effecting the delivery of warmed fresh air into the passenger compartment free of contamination by exhaust gas fumes.

19. A motor vehicle heater for air circuit connection with the low pressure area of the intake manifold of the vehicle engine, comprising a radiator adapted to receive heated air from a warm air zone adjacent the engine exhaust manifold, said radiator having an outlet for connection to the intake manifold whereby a heated air stream will be induced through the radiator to warm the same, air flow means for creating the flow of a fresh air stream over the radiator and into the vehicle passenger compartment, and a suction operated motor for operating said air flow means, said suction operated motor having an air inlet and an air outlet in fluid circuit connection with the radiator and the intake manifold, when connected to the latter, whereby the induced flow of heated air through the radiator also passes through the motor to operate the latter.

20. A motor vehicle heater for air circuit connection with the low pressure area of the intake manifold of the vehicle engine, comprising a radiator adapted to receive heated air from a warm air zone adjacent the engine exhaust manifold, said radiator having an outlet for connection to the intake manifold whereby a heated air stream will be induced through the radiator to warm the same, air flow means for creating the flow of a fresh air stream over the radiator and into the vehicle passenger compartment, and means in fluid connection with the radiator and adapted for fluid connection with the intake manifold for operation by an induced air flow for actuating the air flow means.

HENRY HUEBER.
ERWIN C. HORTON.